A. B. FOWLER.
HYDROCARBON MOTOR.
APPLICATION FILED APR. 29, 1901.

981,753.

Patented Jan. 17, 1911.
6 SHEETS—SHEET 1.

Fig. 1.

WITNESSES
Edward S. Day
Horace Van Everen

INVENTOR
Alfred B. Fowler
by his Attorney
Benjamin Phillips

FIG. 4.

A. B. FOWLER.
HYDROCARBON MOTOR.
APPLICATION FILED APR. 29, 1901.

981,753.

Patented Jan. 17, 1911.
6 SHEETS—SHEET 6.

UNITED STATES PATENT OFFICE.

ALFRED B. FOWLER, OF CENTRAL FALLS, RHODE ISLAND.

HYDROCARBON-MOTOR.

981,753. Specification of Letters Patent. Patented Jan. 17, 1911.

Application filed April 29, 1901. Serial No. 57,973.

*To all whom it may concern:*

Be it known that I, ALFRED B. FOWLER, a citizen of the United States, residing at Central Falls, in the county of Providence and State of Rhode Island, have invented certain new and useful Improvements in Hydrocarbon-Motors; and I do hereby declare the following to be a full, clear, and exact description of the invention, such as will enable others skilled in the art to which it appertains to make and use the same.

The present invention relates to hydrocarbon motors.

The object of the present invention is to reorganize and improve this class of motors in the respects hereinafter pointed out, and to the above end the present invention consists in the hydro-carbon motor hereinafter described and claimed.

In the accompanying drawings which illustrate the preferred form of my invention, Fig. 7 shows the air and oil pump actuating mechanism. Fig. 8 is a horizontal section on line 8—8, Fig. 3, showing the slotted link and its connections; Fig. 9 is a horizontal section on line 9—9, Fig. 3, showing the valves for the air pump; while

Figure 6:
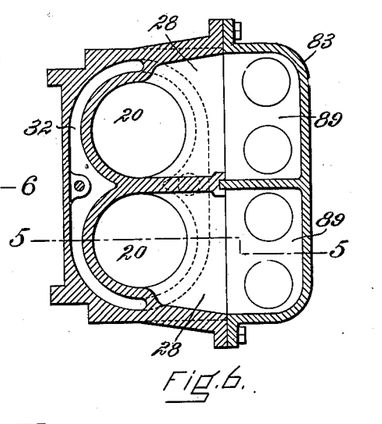

In the accompanying drawings 20 represents the cylinders which are preferably cast in pairs as shown in Fig. 6. Arranged to reciprocate in each cylinder are two pistons 21 provided with the piston rods 22. Cross heads 23 connect the ends of the piston rods at the top and at the bottom of the motor. The main shaft 24 supported in bearings 25 is provided with the cranks 26 set at 180° with each other, and upon said shaft is mounted a suitable balance or fly wheel (not shown). Suitable connecting rods 27 connect the cross heads 23 with the cranks 26.

Figure 5:
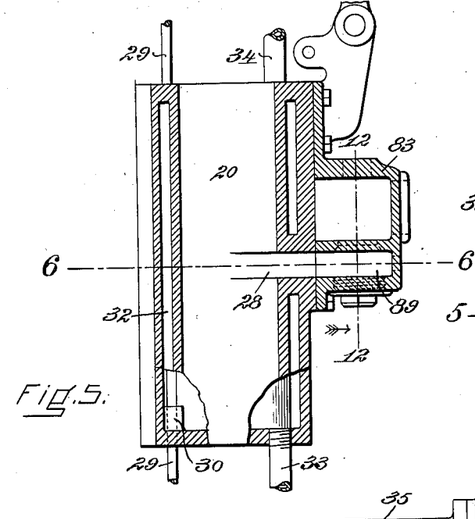
In Figs. 5 and 6 are shown sectional views of a pair of cylinders, Fig. 5 being a longitudinal section on line 5—5, Fig. 6, and Fig. 6 a horizontal section on line 6—6, Fig. 5.

The explosive charge is admitted to the cylinders through the ports 28, and is first compressed between the pistons 21 and then exploded by some suitable ignition device (not shown). As the motor is of the Otto or four-cycle type and as it is desirable to obtain an impulse at each revolution of the shaft, I have arranged the valve and ignition devices so that explosions shall occur first in one pair of cylinders and then in the other alternately at each revolution of the shaft. By causing explosions to occur simultaneously in the diagonally opposite cylinders, there is no tendency in the pistons or piston rods to twist or bind, the connecting rod being connected to the cross head in the line of the diagonally opposite piston rods and equally distant from each. In order to avoid the possibility of binding or twisting of any of these connections through the failure of the ignition devices to explode the charge in one of the cylinders, I have mounted in the lugs or bosses 30, which are cast integral with the cylinders (see Fig. 5), the guide rods 29, and have provided bearings 31 in the web of the cross-heads 23 for said rods.

Excessive heating of the cylinders is avoided by the use of a water jacket 32, having the inlet and outlet pipes 33 and 34 respectively. A proper circulation of water through the water jacket may be obtained in any suitable manner, as by convection or pumping.

In the present invention I have provided an oil pump arranged to throw into the carbureter in a fine spray the liquid fuel such as gasolene, a pump also being provided which draws air through the carbureter. This latter pump is located between the carbureter and the motor cylinders and thus acts as an air pump to supply air to the carbureter, and also delivers the successive charges to the cylinders sometimes under pressure as will be described hereinafter. I do not limit myself, however, to this particular construction or location of pump, as obviously two pumps may be employed, one to supply air to the carbureter and one to deliver the explosive mixture to the cylinder. This pump will be designated throughout the specification as the "air pump" since in either arrangement it acts upon the air supplied to the cylinders, whether before or after the mixture of the fuel therewith. The quality of the explosive mixture produced in this manner is maintained substantially constant by means of devices connecting the oil pump and the air pump whereby the amount of oil sprayed into the incoming air will be in constant ratio to the amount of air so drawn in, this result being accomplished in the present invention by varying the length of stroke of the oil pump in substantially the same ratio as the length of stroke of the air pump is varied to supply more or less charge as more or less power is required.

Figure 1:
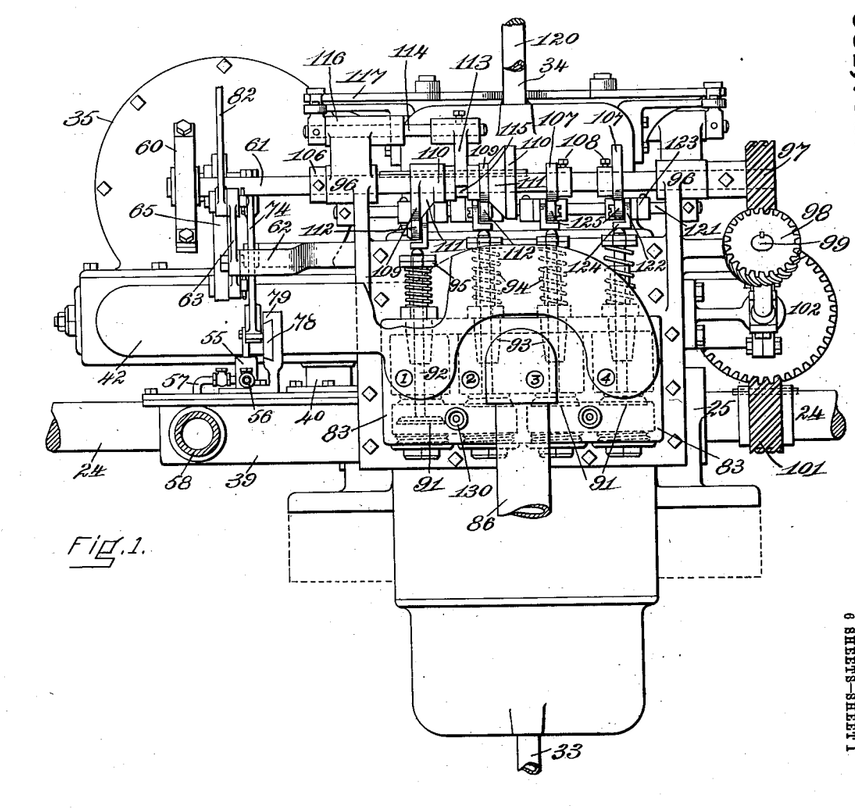
Figure 1 is a front elevation of my improved motor.
Figure 10:
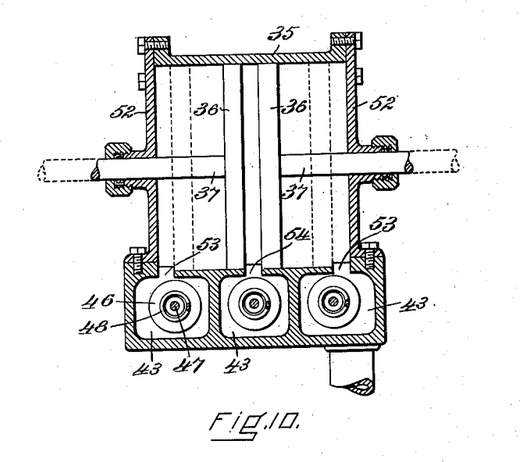
Fig. 10 is a vertical section on line 10—10, Fig. 4, showing the arrangement of ports for the pump.

As shown in Fig. 1, 35 is the air pump which is provided with two pistons 36 and piston rods 37 arranged to reciprocate simultaneously in opposite directions and which acts to supply the explosive mixture to the cylinders. This pump is what might be called a double, double-acting pump. The valve chamber of this pump (see Fig. 9) consists of an inlet chamber 38 connected with the carbureter 39 by the short pipe 40. The outlet chamber 41 is provided at each end with the outlet pipe 42 through which the explosive mixture is conveyed in measured quantities to the valves on each end of the motor. Intermediate the inlet chamber 38 and the outlet chamber 41 are the three chambers 43, each connected with the inlet chamber 38 and the outlet chamber 41 by means of the valve openings 44 and 45 respectively. Check valves 46 are mounted upon the valve spindles 47 rigidly secured in the sides of the valve chamber. The coiled springs 48, engaging at one end the collars 49 secured to said valve spindles 47 and at the other end the valves 46, act normally to hold said valves against the valve openings 44 and prevent the passage of any gas from the chambers 43 into the inlet chamber 38, but permit passage of the gas in the opposite direction. Mounted upon the same valve spindles and located within the outlet chamber 41 are the valves 50 normally held by the springs 51 closing the valve openings 45 and preventing the return of any gases from the outlet chamber 41 into the intermediate chambers 43. In Fig. 10, which is a vertical section through the air pump 35 and the intermediate chambers 43, are shown the ports connecting these chambers 43 with the interior of the air pump cylinder. The pistons 36 are shown in full line at the extent of their movement toward each other, while the dotted lines show the limit of their movement away from each other, the capacity of this pump being about one-fourth greater than the space swept by the motor pistons in order that a greater charge may be forced into the cylinders than would be contained in this space at atmospheric pressure. In this way the maximum power obtainable from the motor is increased, the air pump at this time operating as a force pump. It will be seen in connection with Fig. 9 that as the pistons begin to move apart, the gases contained in the cylinder between the pistons and the heads 52 will pass down through the ports 53 into the two outside intermediate chambers 43 and from these into the outlet chamber 41 and thence through the pipe 42 to the motor cylinders. At the same time gas will be drawn from the inlet chamber 38 through the middle intermediate chamber 43 and thence through the port 54 into the cylinder of the air pump between the pistons 36. When the pistons reach the limit of their movement away from each other and then begin to approach, the gas contained between the pistons will pass down through the intermediate chamber 43 into the outlet chamber 41 to supply the cylinders of the motor with fresh charges. At the same time gas will be drawn from the inlet chamber 38 through the two outside intermediate chambers 43 into the air pump cylinder.

Figure 11:
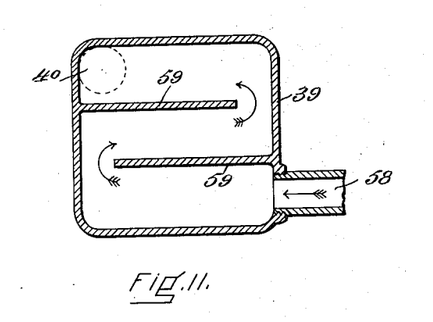
Fig. 11 is a horizontal section on line 11—11, Fig. 3, showing the interior of the mixing chamber.

The oil pump 55 (see Fig. 3) may be of any desired form or type and is arranged to draw the gasolene or other liquid fuel from a suitable source of supply through the supply pipe 56 and force it through the pipe 57 in measured quantities into the carbureter 39 in the form of a fine spray where it is completely vaporized and mixed with the incoming air. The carbureter, which is shown in section in Fig. 11, comprises a rectangular chamber into which the air is drawn through the inlet pipe 58. A short connecting pipe 40, the position of which is indicated in Fig. 11 by the broken line, conducts the explosive mixture from the carbureter to the inlet chamber 38. In order to produce a uniform mixture of gas and air I have provided the interior of the carbureter with baffles 59 which act to mix the volatilized fuel with the air as both are drawn through the carbureter, producing an explosive mixture of even and uniform quality.

The air pump 35 is actuated by means of eccentric 60 keyed upon the shaft 61 which is rotated in a manner hereinafter to be described.

Figure 3:
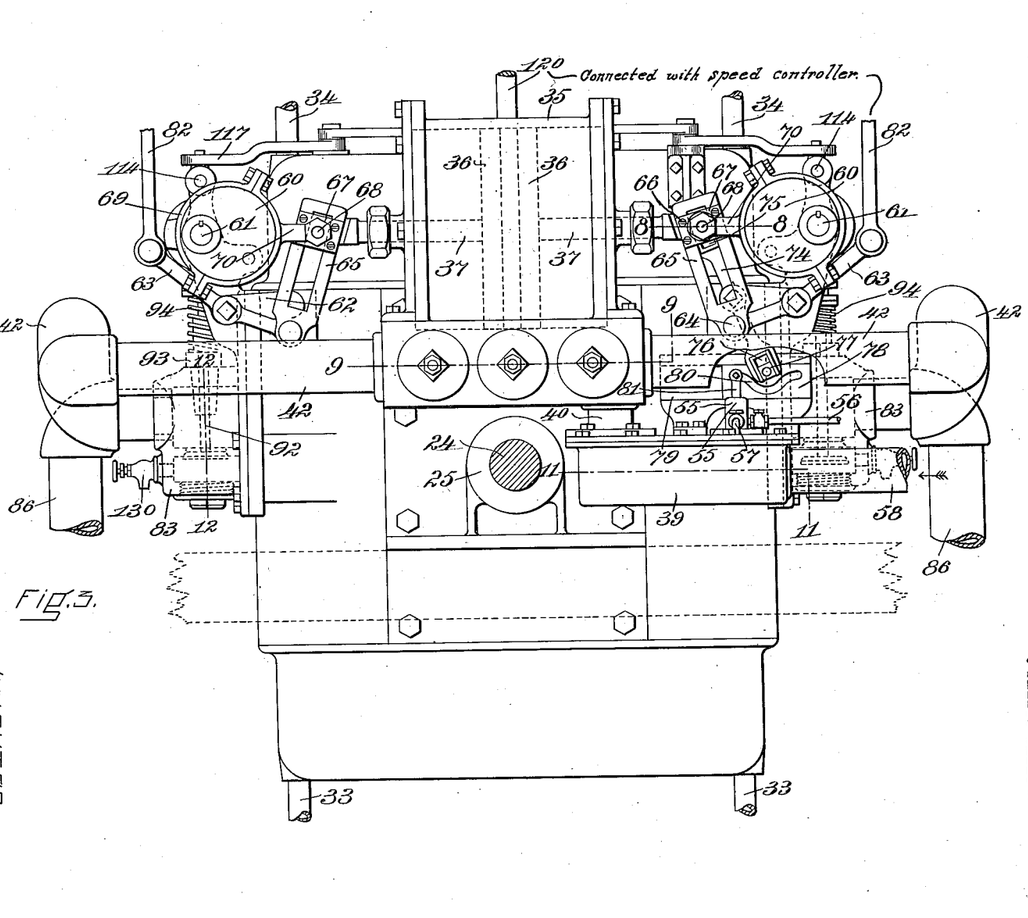
Fig. 3 is a side elevation looking from the left, Fig. 1.

Pivotally mounted upon an arm of the bracket 62 projected from the frame of the motor is the bent lever 63 pivotally connected at one end 64 to the slotted link 65. Fixedly secured to the upper end of said link by means of the screws 66 is the plate 67 carrying the bearing stud 68 formed integral therewith as is clearly shown in Fig. 8. An eccentric strap 69 provided with the arm 70 connected to said stud 68 acts to oscillate the slotted link about its pivotal support 64 on the lever 63. A slide block 71 is mounted within the slot of the link 65 and the piston rod 37 is pivotally connected to said slide block by means of a stud 72 screwed into the block and provided with a cylindrical head 73. The above described arrangement is such that oscillation of the slotted link will cause rectilinear reciprocation of the piston rods and pistons, two sets of this actuating mechanism being provided, one for each end of the motor as shown in Fig. 3.

Pivotally mounted upon the bracket 62 is the straight lever 74 having the slotted ends 75 and 76. The upper end 75 engages the cylindrical head 73 of the stud 72, while the lower end engages the block 77 which is pivotally mounted upon the plate 78 arranged to slide in the guide way 79 supported upon the carbureter 39 as shown in Fig. 1. Said plate 78 is provided with a cam slot or groove 80 which is engaged by a cam roll (not shown) mounted upon the piston rod 81 of the oil pump 55, causing vertical reciprocations of said piston rod as the slide plate 78 is reciprocated horizontally. Inasmuch as the piston of the oil pump makes two reciprocations for each reciprocation of the air pump pistons, but one oil pump is required and the mechanism just described is not duplicated on the left hand end of the motor (see Fig. 3).

Figures 7, 8, 9:
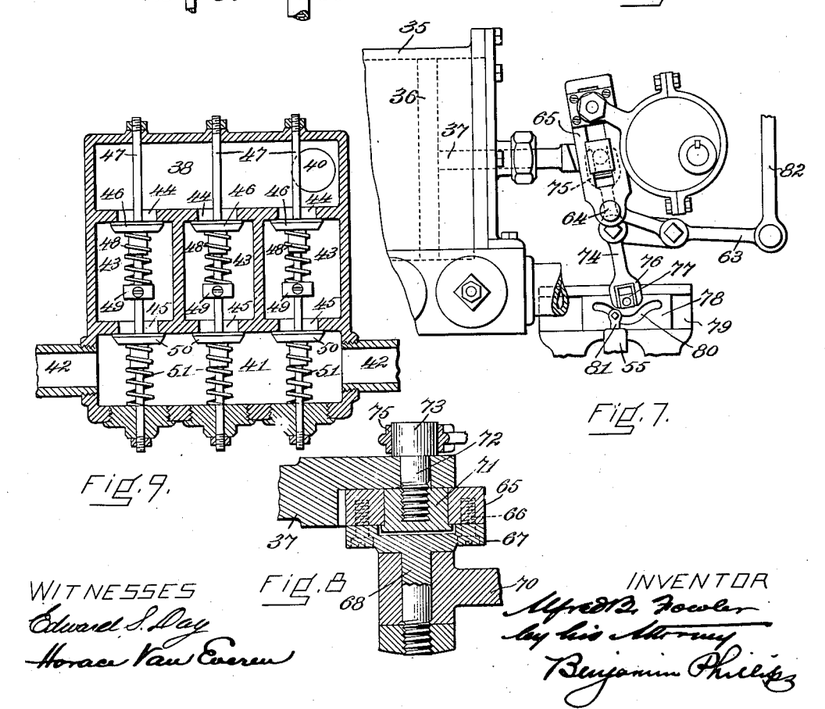

The object of the above arrangement is to automatically vary in substantially the same ratio the length of stroke of the oil and of the air pump so that the quantity of the explosive mixture may be increased or diminished according to the power required, the quality remaining substantially constant, thus burning or exploding the gas so as to develop the maximum amount of power. By turning the bent lever 63 about its pivotal support on the bracket 62, the link 65 will be raised as is shown in Fig. 7 and the amplitude of oscillation of the same diminished, reducing proportionately the extent of reciprocation of the piston. Moreover, the block 71 now being nearer the fulcrum 64, the extent of reciprocation of the piston rod and piston will be still further diminished, reducing proportionally the quantity of explosive mixture delivered through the pipes 42 to the motor cylinders. The oscillations of the lever 74 will also be diminished in the same ratio as the reciprocation of the piston 36 of the air pump, the stroke of the piston 81 of the oil pump being thus reduced and the amount of liquid fuel sprayed into the carbureter diminished substantially as the amount of air drawn therethrough is diminished.

I prefer to so construct and arrange the oil pump actuating mechanism that the ratio of the length of stroke of the oil pump to that of the air pump shall slightly increase as the extent of movement of the piston of the air pump is diminished, in order that the mixture when supplied in smaller quantities may be slightly richer than when supplied in larger quantities. This is because the larger the charge, the greater will be the degree of compression, and the greater the compression the easier will be the ignition. It is to counterbalance this increased difficulty of igniting the less compressed charge that I have increased slightly the proportion of fuel to air, and in the present invention I have accomplished this result by so shaping the cam groove 80 in the plate 78 that the angular inclination to the horizontal of successive portions of the groove diminishes as the distance from the lowest portion of said groove increases.

The bent levers 63 are arranged to be operated through connections 82 by a single controlling means (not shown). This may be a hand lever, but preferably is some suitable automatic governing device which shall act to raise the slotted link 65 to diminish the charge whenever the speed of the motor exceeds the predetermined speed, and conversely to lower the link when the speed falls below the predetermined speed.

The valve mechanism controlling the supply of explosive mixture to the cylinders and the discharge of the burned gases therefrom will now be described.

Figure 12:
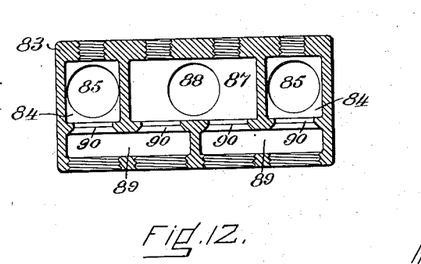
Fig. 12 is a vertical section on line 12—12, Fig. 3, looking toward the left.

In Fig. 12, which is a vertical section on line 12—12, Fig. 3, looking toward the left, is shown the valve chest 83, the valves and valve spindles being removed. This valve chest comprises two inlet chambers 84 into which the explosive mixture is conducted by the pipes 42 through the openings 85, the section of supply pipe connecting these two chambers being arched, as shown in Fig. 1, over the exhaust pipe 86 which carries the exhaust gases from the outlet chamber 87 through the opening 88 to some convenient point where they are discharged into the air. The explosive gases pass from the inlet chambers 84 through the intermediate chambers 89 and ports 28 into the cylinders where they are first compressed and then ignited. After expansion they return through the same ports and intermediate chambers 89 into the exhaust chamber 87 and thence through its opening 88 and the exhaust pipe 86 into the open air. Valves 91 have been provided, which are of the ordinary puppet type, for opening and closing the valve openings 90 between the intermediate and the inlet and exhaust chambers. The valves 91 are mounted upon valve spindles 92 which are arranged to move vertically in bearings in screw plugs 93 secured in the upper end of the inlet and outlet chambers.

These valves are normally held in their raised or closed position by means of coiled springs 94 engaging at one end the head of the screw plug 93 and at the other end a collar 95 secured to the valve spindle. The valves 91 are positively actuated by means of cams mounted upon a rotating shaft, cam rolls engaging the cams, and pivotally supported levers upon which the cam rolls are mounted and by which the valve spindles are depressed at the proper time. The shaft 61 upon which these cams are mounted is the same shaft which carries the eccentric 60 for actuating the oil and air pumps. It is to be understood in this connection that two sets of valves and valve operating mechanism are provided, one at each end of the motor, each set controlling the admission and exhaust of the gases to and from the pair of cylinders at that end of the motor. The shaft 61 is supported in bearings 96 and carries at one end the skew gear 97 meshing with the skew gear 98 keyed upon the inclined shaft 99 which is supported in the bearing 100. Keyed upon the main driving shaft is the skew gear 101 meshing with the skew gear 102 which is fixedly secured upon the short shaft 103 supported in bearings 104. The shafts 103 and 99 are connected by a gimbal or universal joint 105. Gear 102 being just twice the diameter of gear 101 and gears 97 and 98 being of equal diameter, the shaft 61 will be rotated at just half the speed of the main driving shaft of the motor. The shaft 61 is held from longitudinal movement by the collar 106 and the sleeve of the gear 97.

Figure 4:
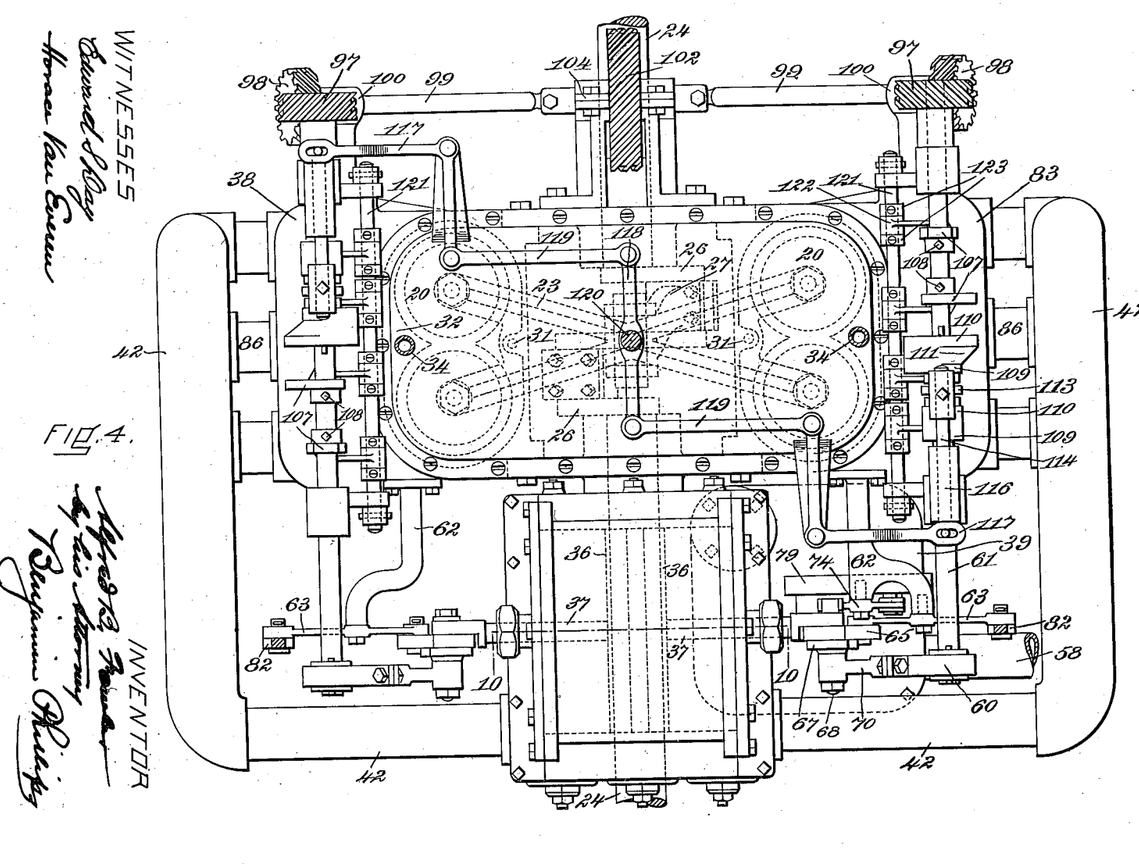
Fig. 4 a top plan, Fig. 3.

As seen in Fig. 1, the two right-hand cams 107 are fixedly secured upon the shaft 61 by the set screws 108. The two left-hand cams 109 are made integral and provided with circular portions 110, being splined upon the shaft 61 so that they may be moved longitudinally on said shaft to bring the circular portions in engagement with the cam rolls and impart no movement while in this position to the valve spindles. By means of an inclined section 111 located intermediate the cam portions 109 and the circular portions 110 it is possible to move these cams longitudinally during the operation of the machine, the inclined portion permitting the cam rolls to ride up and ride down from one of these portions to the other. The cam rolls 112 which engage these cams 109 are provided with a frusto-conical portion which is intended to engage the inclined portions 111 in the relative longitudinal movement of the cams and cam rolls. The cams are moved longitudinally of shaft 61 or "shipped" by means of an arm 113 fixedly secured upon a short, longitudinally movable shaft 114, the end of said arm being forked and entering a groove 115 in the sleeve between the cams. The short shaft 114 is arranged to slide longitudinally in its bearings 116 by means of a bell crank lever 117, as shown in Fig. 4, which is actuated by the lever 118 through the connecting link 119. The vertical spindle 120 which is preferably integral with lever 118 is arranged to be rotated either manually or through the governing device to "ship" the cams. As shown in Fig. 4 the cams controlling the valves of two diagonally opposite cylinders may be "shipped", the object being to throw out of operation such diagonally opposite cylinders whenever it is desired to reduce the power to a considerable extent, it being more economical to actuate one pair of cylinders at full power or half power than all four cylinders at half power or quarter power respectively.

Figure 2:
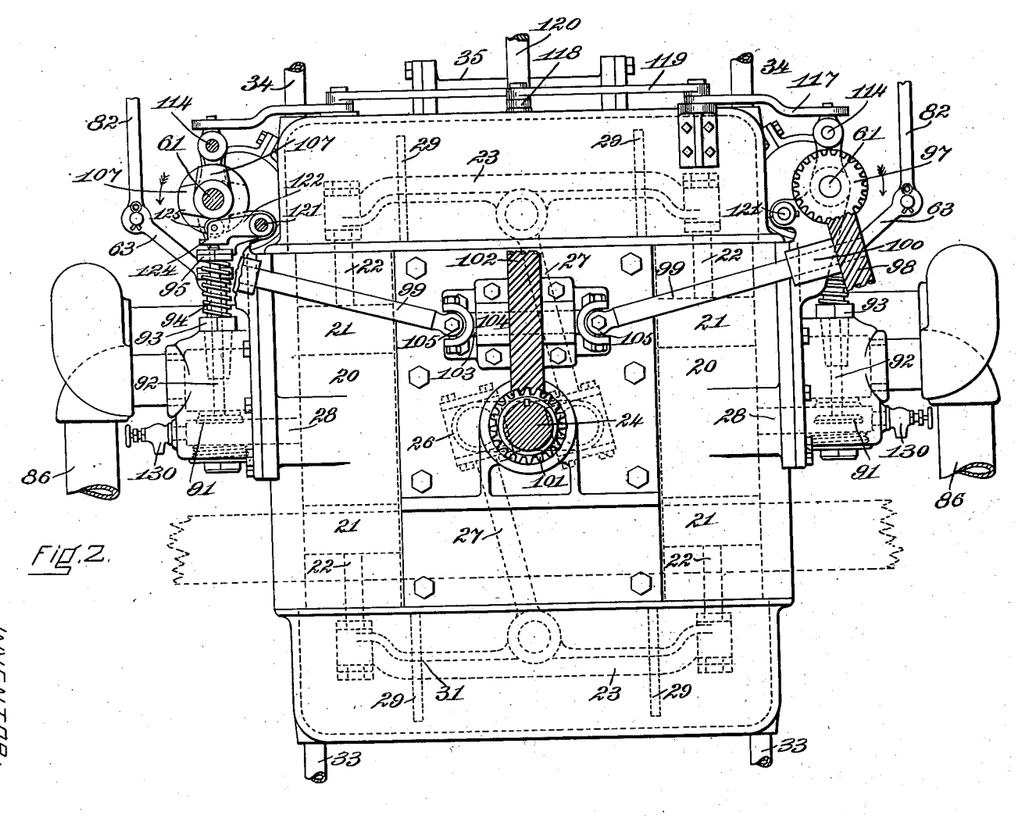
Fig. 2 is a side elevation looking from the right, Fig. 1.

Pivotally mounted upon the shaft 121 and held from longitudinal movement thereon by the collars 123 are the levers 122 upon which are mounted the cam rolls. The members 122, as shown in Figs. 1 and 2, are provided with a short horizontal portion 124 which engages and depresses the valve spindles 92 whenever the cam roll is depressed by the cam, the springs 94 tending to lift the valve spindles and thus holding the cam rolls in contact with the cam surfaces. The cam rolls 125 which engage the plain cams 107 have no conical portion, as these cams and cam rolls are intended never to be thrown out of engagement. Since shaft 61 rotates at half the speed of the main driving shaft of the motor, the valve spindles 92 will be depressed by the cams but once in every two revolutions of the main shaft, the cams being so formed and set with relation to each other that the valves will be operated in the following cycle:—Numbering the valves and their actuating mechanism from the left (see Fig. 1), it will be seen that valve 1 is open to admit a charge of explosive mixture to the cylinder, the pistons in this cylinder moving apart at this time. The exhaust valve 2 of this cylinder is of course closed, as are both valves of the adjacent cylinder, as the charge in that cylinder has just been ignited and is expanding. When the pistons have separated to their limit, the inlet valve 1 closes and both valves 1 and 2 remain closed during the next half revolution of the main shaft, while the charge in this cylinder is being compressed. Exhaust valve 3 for the adjacent cylinder opens at this time and permits the burned gases to be discharged from that cylinder. The engine shaft has now made one complete revolution and the cam shaft one half a revolution. While the charge is being fired in the first mentioned cylinder, the inlet valve 4 opens to admit a fresh charge to the adjacent cylinder, which is compressed during the second half of the second revolution of the main shaft and the last quarter of the revolution of the cam shaft, valves 3 and 4 remaining closed and the exhaust valve of the former cylinder opening to permit the burned gases to be discharged. The cycle of operations is then repeated, charges being exploded alternately in each cylinder, imparting an impulse to the engine shaft at each revolution. If the power required becomes so small that it is more economical to operate a single pair of cylinders than by dividing up the charge among the four cylinders, the shaft 120 will be rotated, sliding the cams 109 toward the left as viewed in Fig. 1. The cam roll for cam 1, i. e. the cam at the extreme left, will run down the incline 111 to the circular portion 110 and the continued rotation of shaft 61 will have no effect upon inlet valve 1 which now remains closed. The cam roll for cam 2, however, will roll up the incline 111 onto the circular portion 110 which will cause the exhaust valve 2 to remain open, preventing unnecessary absorption of power by compressing the air or burned gases in the idle cylinders. By means of suitable connections (not shown in the drawing) between the cam shipping mechanism and the lever 82, the length of stroke of the air and oil pumps is diminished when the two diagonally opposite cylinders are thrown out of operation, the amount of reduction in the strokes of the pumps being about one half.

The operation of my improved hydro-carbon motor is as follows:—A charge being exploded in two of the cylinders which are diagonally opposite each other, the pistons in said cylinders are driven apart, the pistons in the idle cylinders during this movement drawing in a fresh charge and on the return stroke compressing the same, while the first mentioned pistons are expelling the burned gases. The compressed charge in the second pair of cylinders is now exploded, imparting another impulse to the driving shaft and the pistons of the first set drawing in a fresh charge. If the motor begins to gain in speed, the lever 63 is moved to raise the slotted link and decrease the extent of reciprocation of the air pump and oil pump piston rods, thus diminishing the quantity of explosive mixture which will be supplied to the cylinders thereafter and slightly enriching the gas at the same time. If the power demanded of the motor becomes still smaller, two of the cylinders which are diagonally opposite to each other will be cut out of operation by the shipping of the cams 109, and the inlet valves for said cylinders will remain closed while the exhaust valve will be held open to avoid compression of the gases in these cylinders, the strokes of the air and oil pumps being still further diminished.

Should the speed decrease instead of increase, the lever 63 will be moved in the opposite direction to lower the slotted link 65, thus increasing the extent of reciprocation of the oil and air pump pistons and increasing the quantity and slightly diminishing the richness of the mixture supplied to the cylinders. If the demand upon the motor increases still more, the extent of movement of the piston of the air pump becomes so great that the charges are forced into the cylinders under compression to obtain the maximum power.

Having thus described my invention I claim as new and desire to secure by Letters Patent of the United States—

1. A hydro-carbon motor having, in combination, a cylinder, a piston, a carbureter, an air pump provided with a piston and arranged to draw a charge from the carbureter and inject it into the cylinder, an oil pump provided with a piston and arranged to inject oil into the carbureter, means for actuating the pump pistons, and connected mechanism for varying the length of their strokes, substantially as described.

2. A hydro-carbon motor, having, in combination, an air pump and an oil pump each provided with a piston and a piston rod, a slotted link mounted upon a pivotal support, means for oscillating the link, a slide block, connections between the piston rods and the slide block, and means for varying the distance of the slide block from the pivotal support of the link to vary the extent of movement of the piston rods, substantially as described.

3. A hydro-carbon motor, having, in combination, an oil pump provided with a piston and piston rod, a slide provided with a cam, connections between the piston rod and the cam, means for reciprocating the slide, and means for varying the extent of movement of the slide to vary the stroke of the piston rod, substantially as described.

4. A hydro-carbon motor, having, in combination, a cylinder, an air pump, an oil pump, means for actuating the pumps, means for varying the quantity of air and of oil delivered by the pumps, and means for automatically increasing the proportion of oil to air as the quantity of air delivered by the air pump is diminished, substantially as described.

5. A hydro-carbon motor, having, in combination, a cylinder, an air pump, an oil pump, pistons and piston rods for the pumps, means for actuating the piston rods, and connected mechanism for diminishing the extent of movement of the piston rods, constructed and arranged to diminish the movement of the air pump piston proportionately more than that of the oil pump piston, substantially as described.

6. A hydro-carbon motor having, in combination, a cylinder, a piston, a carbureter, an air pump provided with a piston and arranged to draw a charge from the carbureter and inject it into the cylinder, an oil pump provided with a piston and arranged to inject oil into the carbureter, and actuating mechanism for imparting strokes of variable lengths to the pump pistons, substantially as described.

In testimony whereof I affix my signature, in presence of two witnesses.

ALFRED B. FOWLER.

Witnesses:
EDWARD W. BLODGETT,
FLORENCE E. BATES.